Sept. 16, 1969    O. BONNER    3,466,784
FISHING LINE TWIRLER
Filed Nov. 17, 1967    2 Sheets-Sheet 1
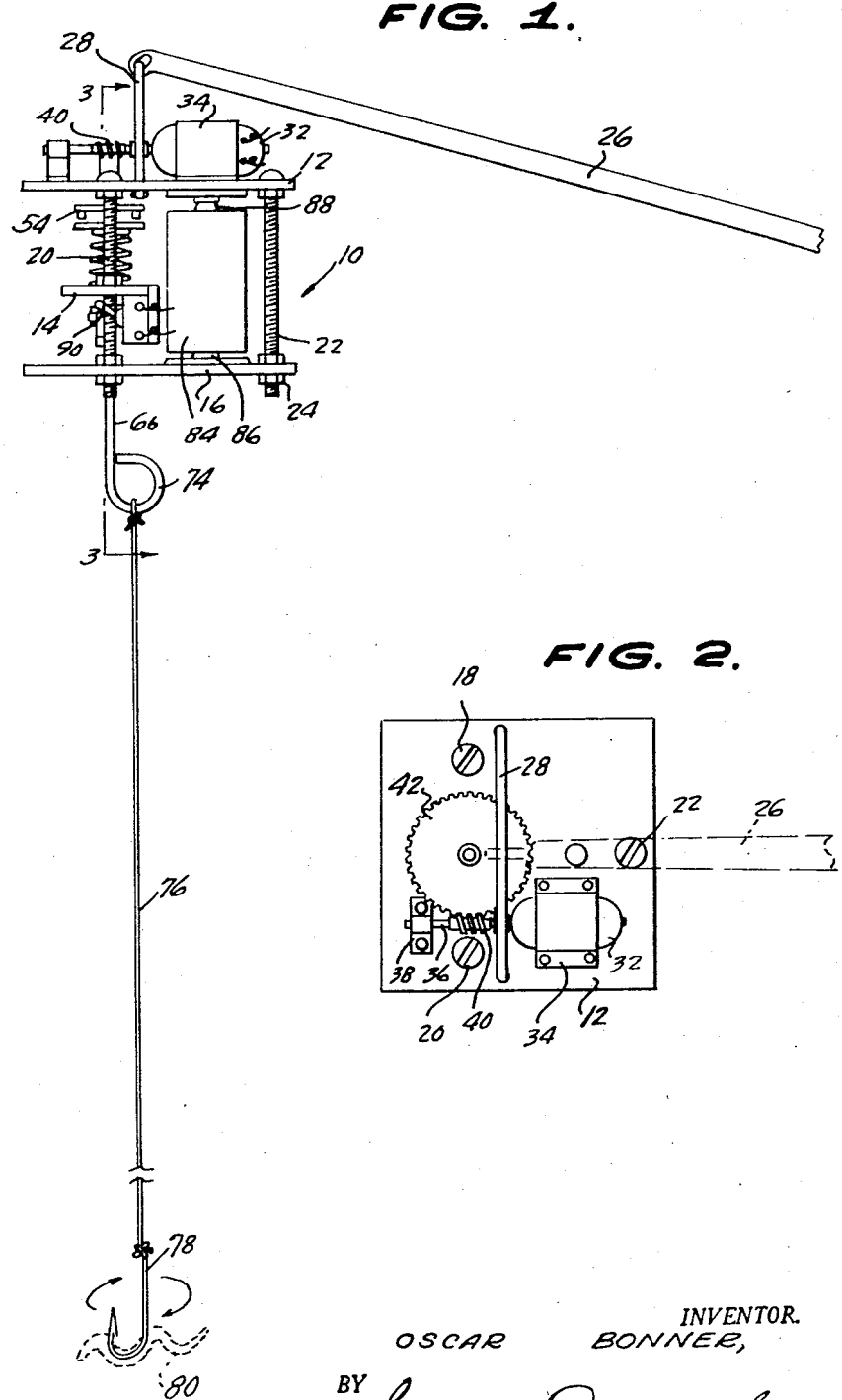
INVENTOR.
OSCAR BONNER,
BY Berman, Davidson & Berman
ATTORNEYS.

Sept. 16, 1969   O. BONNER   3,466,784
FISHING LINE TWIRLER

Filed Nov. 17, 1967   2 Sheets-Sheet 2

INVENTOR.
OSCAR BONNER,
BY
Berman, Davidson & Berman
ATTORNEYS.

United States Patent Office 3,466,784
Patented Sept. 16, 1969

3,466,784
FISHING LINE TWIRLER
Oscar Bonner, 15090 Mark Twain,
Detroit, Mich. 48227
Filed Nov. 17, 1967, Ser. No. 683,947
Int. Cl. A01k 85/06, 97/00
U.S. Cl. 43—19.2                                    10 Claims

ABSTRACT OF THE DISCLOSURE

A line twirler for rotating and jiggling fishbait, to simulate the bait's natural movement. The twirling mechanism is held by a fishing rod, and includes a battery-operated motor, which, through a gear arrangement, rotates a shaft holding the fishing line. A clutch is provided on the shaft for disengaging the shaft from the drive motor, upon a downward pull on the shaft exerted by a hooked fish. As an additional safety feature, a cam is fixed to the shaft, which, when the shaft is moved downwardly, causes a cam follower to pivot and open a switch disconnecting the drive motor.

---

This invention relates to a line twirler, and more particularly, a line twirler adapted to be connected to a fishing line for rotating a fishbait.

Fish will be more readily attracted to a bait on a fishing line if the bait looks and acts natural. Accordingly, it is an object of this invention to provide a device for jiggling and rotating a fishbait, such as a worm, to simulate the natural movement of the bait and thereby attract fish to the line.

The foregoing object is achieved by connecting the fish line to a device which will twirl or rotate the line when in the water. The line twirler is positioned on the end of a fishing rod, and includes a motor-driven, rotatable shaft connected to the line. When a fish strikes, a clutch disengages the shaft from the drive to prevent the line from being twisted and broken, and the fisherman can naturally play the fish. As the shaft is disengaged, provision is also made to automatically shut down the motor, preventing it from overloading and burning out.

Further objects and advantages of the invention will become apparent from the following description and claims, and from the accompanying drawings, wherein:

FIGURE 1 is a front view in elevation of the line twirler comprising the subject matter of the present invention;

FIGURE 2 is a top plan view thereof;

Figure 3:
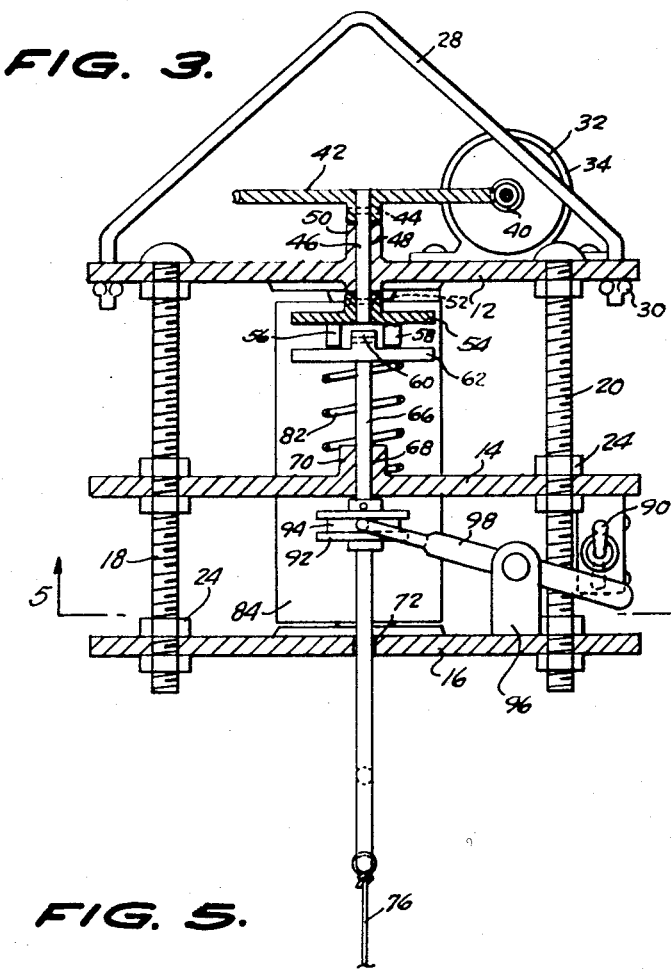
FIGURE 3 is a cross-sectional view taken substantially along the plane indicated by line 3—3 of FIGURE 1.

Referring now to the drawings in detail, wherein like numerals indicate like elements throughout the several views, the line twirler is generally indicated by the numeral 10.

Line twirler 10 includes three parallel, planar support plates 12, 14 and 16, connected by three vertically extending screws 18, 20, and 22. Plates 12, 14 and 16 are vertically adjustable with respect to each other by loosening and retightening nuts 24. Plates 12 and 16 are substantially the same size, while plate 14 is smaller in width, as clearly shown in FIGURE 1.

Line twirler 10 is attached to the fishing rod 26 by means of a bail member 28, whose ends extend through openings in top support plate 12, and are crimped as shown at 30. Bail 28 can be permanently connected to a loop on the end of rod 26, or can be removable by hanging it from a hook formed on the end of the rod.

Top plate 12 supports a battery-operated electric motor 32 housed within a bracket 34 secured to the plate. Electric motor 32 has a shaft 36 rotatable within a bearing housed within bracket 38 on plate 12. Keyed or otherwise fixed to motor shaft 36 is a worm 40.

Worm 40 is in meshing engagement with a worm gear 42, fixed by a pin 44 to one end of a shaft 46 extending through a bore 48 in a hub 50, projecting upwardly and downwardly from top support plate 12. The opposite end of shaft 46 is connected by a pin 52 to a clutch disk 54 having a pair of vertical teeth 56 and 58.

Teeth 56 and 58, when rotated, are adapted to contact a bar 60, integrally secured along a diameter of a second clutch disk 62, to impart their rotation to disk 62, when disks 54 and 62 are closely spaced.

Connected to clutch disk 62 by a pin is line-twirling shaft 66. Shaft 66 passes through a bore 68 in hub 70, projecting upwardly from intermediate support plate 14, and passes through an aperture 72 in bottom support plate 16. Shaft 66 terminates in a loop 74, to which a fish line 76 is secured. Fish line 76 carries a hook 78 and a bait, such as a worm 80, to be rotated.

A coil spring 82 is wound about shaft 66 between intermediate plate 14 and the bottom of clutch disk 62. Spring 82 normally urges clutch disk 62 towards clutch disk 54 so that teeth 56 and 58 will contact bar 60.

A flashlight battery 84 is adapted to be supported between electrical contact 86 on plate 16 and electrical contact 88 depending from plate 12, to energize motor 32. Contacts 86 and 88 are connected to motor 32 in a conventional electrical circuit, in which switch 90, supported beneath plate 14, is interposed.

In use and operation, switch 90 is closed to energize electric motor 32. Energization of motor 32 will cause rotation of worm 40 and meshing worm gear 42. Worm gear 42 in turn will rotate shaft 46 which turns clutch disk 54. Under the urging of spring 82, teeth 56 and 58 on disk 54 contact bar 60 and impart rotation to clutch disk 62. Rotation of clutch disk 62 rotates shaft 66 which twirls line 76, hook 78 and bait 80. Rotation of bait 80 simulates its natural movement and will attract fish to line 76.

Figure 4:
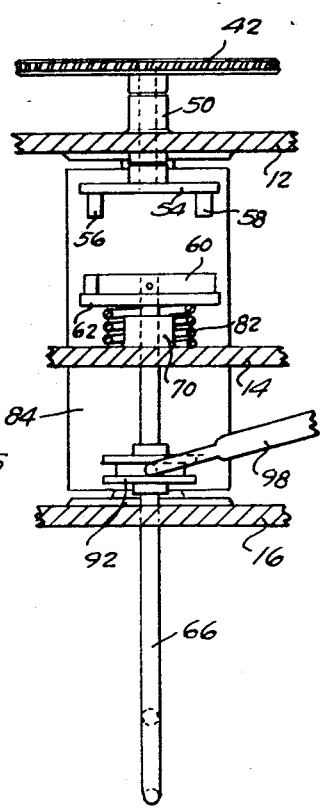
FIGURE 4 is a view similar to FIGURE 3, but illustrating the line twirler shaft disengaged from its drive.
Figure 5:
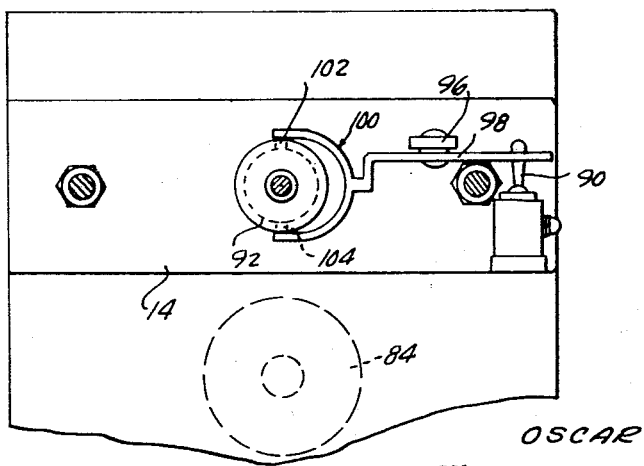
FIGURE 5 is a cross-sectional view taken substantially along the plane indicated by line 5—5 of FIGURE 3.

Should a fish be hooked on line 76, the weight of the fish will pull shaft 66 downwardly against the bias of spring 82, as shown in FIGURE 4. This will cause bar 60 on clutch disk 62 to move out of the path of rotation of teeth 56 and 58, preventing further rotation of shaft 66 and line 76. The fisherman can then play the fish without fear that line 76 will be twisted and possibly broken.

As a further safety feature, a cam 92 is fixed to shaft 66 between intermediate plate 14 and bottom plate 16. Cam 92 includes an annular groove 94.

A bracket 96 secured to bottom plate 16 pivotably mounts a cam follower in the form of an elongated arm 98, having a bifurcated end 100. Each furcation terminates in a pintle 102 and 104 seated in groove 94 on cam 92.

When shaft 66 is moved downwardly under the weight of a fish, cam 92 moves downwardly causing arm 98 to pivot about its fulcrum on bracket 96. The rear portion of arm 98 strikes switch 90 and opens the motor circuit, de-energizing the motor. This will prolong the life of battery 84 and prevent motor 32 from becoming overheated and burning out.

The distance between plate 14 and plate 12 can be varied by loosening nuts 24 to adjust the tension on spring 82. In a similar manner, plate 16 can be adjusted relative to plate 14 to insure that arm 98 will contact switch 90.

While a specific embodiment of my invention has been disclosed in the foregoing description, it will be understood that various modifications may occur to those skilled in the art. Therefore, it is intended that no limitation be placed on the scope of the invention.

I claim:
1. Apparatus for twirling a fishing line comprising an elongated upright shaft adapted to be secured to a fishing line, drive means mechanically coupled to said shaft for rotating said shaft about its longitudinal axis, and means operatively responsive to a predetermined downward pull on said shaft for mechanically disconnecting said drive means from said shaft.
2. Apparatus in accordance with claim 1 wherein said drive means includes an electric motor.
3. Apparatus in accordance with claim 2 including means operatively responsive to a predetermined downward pull on said shaft for electrically disconnecting said electric motor.
4. Apparatus in accordance with claim 1 wherein said last-named means includes a pair of clutch disks between said shaft and drive means.
5. Apparatus in accordance with claim 4 including spring means wound about said shaft for normally pushing said clutch disks together.
6. Apparatus in accordance with claim 5 wherein one of said clutch disks includes a bar, and the other of said clutch disks includes a pair of projecting teeth straddling said bar.
7. Apparatus for twirling a fishing line comprising an elongated upright shaft adapted to be secured to a fishing line, electric motor means mechanically coupled to said shaft for rotating said shaft about its longitudinal axis, and means operatively responsive to a predetermined downward pull on said shaft for de-energizing said electric motor means.
8. Apparatus in accordance with claim 7 including switch means for energizing said electric motor means, and said de-energizing means opens said switch means in response to a downward pull on said shaft.
9. Apparatus in accordance with claim 8 wherein said de-energizing means includes a cam fixed to said shaft, and a follower arm pivoted intermediate its ends in contact with said cam, said follower arm being pivotable in response to linear movement of said cam to strike said switch means.
10. Apparatus in accordance with claim 1 including support means for said drive means, and a bail connected to said supports means for connecting said apparatus to a fishing rod.

References Cited

UNITED STATES PATENTS

| | | | |
|---|---|---|---|
| Re. 18,359 | 2/1932 | Nelson | 43—26.2 |
| 788,047 | 4/1905 | Holz et al. | 43—26.1 |
| 2,665,591 | 1/1954 | Casselman | 43—26.1 X |
| 2,746,198 | 5/1956 | Smith | 43—19.2 |
| 3,168,789 | 2/1965 | Gednalske | 43—19.2 |

FOREIGN PATENTS 764,665   8/1967   Canada.

ALDRICH F. MEDBERY, Primary Examiner

JAMES H. CZERWONKY, Assistant Examiner

U.S. Cl. X.R.

43—26.1